(12) United States Patent
Lin et al.

(10) Patent No.: US 8,319,433 B2
(45) Date of Patent: Nov. 27, 2012

(54) LED-BASED LIGHTING SYSTEM FOR RETROFITTING FLUORESCENT LIGHTING FIXTURES IN A TRANSIT VEHICLE

(75) Inventors: Jerry Lin, Glendora, CA (US); Yongchang Wang, Diamond Bar, CA (US)

(73) Assignee: I/O Controls Corporation, Azusa, CA (US)

( * ) Notice: Subject to any disclaimer, the term of this patent is extended or adjusted under 35 U.S.C. 154(b) by 354 days.

(21) Appl. No.: 12/576,164

(22) Filed: Oct. 8, 2009

(65) Prior Publication Data
US 2011/0084608 A1 Apr. 14, 2011

(51) Int. Cl.
*B60Q 1/14* (2006.01)
*G05F 1/00* (2006.01)
*H05B 37/02* (2006.01)
*H05B 39/04* (2006.01)
*H05B 41/36* (2006.01)
*H05B 37/00* (2006.01)
*H05B 39/00* (2006.01)
*H05B 41/00* (2006.01)

(52) U.S. Cl. ............................ 315/77; 315/291; 315/312
(58) Field of Classification Search .................. None
See application file for complete search history.

(56) References Cited

U.S. PATENT DOCUMENTS

| | | | |
|---|---|---|---|
| 5,860,628 A * | 1/1999 | Miani et al. ............. 248/223.41 |
| 6,161,910 A | 12/2000 | Reisenauer et al. | |
| 6,762,562 B2 | 7/2004 | Leong | |
| 6,786,625 B2 | 9/2004 | Wesson | |
| 6,853,151 B2 | 2/2005 | Leong et al. | |
| 7,067,992 B2 | 6/2006 | Leong et al. | |
| 7,168,843 B2 | 1/2007 | Striebel | |
| 7,202,613 B2 | 4/2007 | Morgan et al. | |
| 7,262,752 B2 * | 8/2007 | Weindorf ........................ 345/82 |
| 7,307,391 B2 * | 12/2007 | Shan ............................. 315/291 |
| 7,344,279 B2 | 3/2008 | Mueller et al. | |
| 7,490,957 B2 | 2/2009 | Leong et al. | |
| 7,507,001 B2 | 3/2009 | Kit | |
| 7,815,338 B2 * | 10/2010 | Siemiet et al. ................ 362/218 |
| 7,862,195 B2 * | 1/2011 | Stack et al. .................... 362/125 |

(Continued)

OTHER PUBLICATIONS

International Searching Authority, European Patent Office, "Invitation to Pay Additional Fees, Annex: Communication Relating to the Results of the Partial International Search", PCT Patent Application No. PCT/US2008/008766, mailed Jun. 11, 2010.

*Primary Examiner* — Douglas W Owens
*Assistant Examiner* — Dedei K Hammond
(74) *Attorney, Agent, or Firm* — Irell & Manella LLP

(57) ABSTRACT

An LED-based lighting unit for retrofitting a fluorescent light fixture in a transit vehicle has a concave frame or structure conforming to the shape of the fluorescent lighting fixture cavity, connector pins on either end of the frame for secure attachment to sockets of the fluorescent fixture, a plurality of LED modules for illuminating an area of a transit vehicle, a power adapter for receiving and converting an input power supply signal, and a diffusive lens cover. The frame may have rear fins or other features for facilitating dissipation of heat generated by the LEDs. A controller adjusts the intensity of the LEDs based on a reading from a temperature sensor and on a manual brightness setting. The change in light output may be accomplished by reducing a duty cycle of a pulse width modulated (PWM) waveform supplying the LEDs.

34 Claims, 5 Drawing Sheets

U.S. PATENT DOCUMENTS

| | | |
|---|---|---|
| 8,025,423 B2 | 9/2011 | Hancock et al. |
| 8,115,411 B2 | 2/2012 | Shan |
| 2004/0012959 A1 | 1/2004 | Robertson et al. |
| 2004/0160199 A1 | 8/2004 | Morgan et al. |
| 2005/0041424 A1 | 2/2005 | Ducharme |
| 2006/0049332 A1 | 3/2006 | Vornsand et al. |
| 2006/0202850 A1* | 9/2006 | Hefright et al. .......... 340/815.45 |
| 2008/0149810 A1* | 6/2008 | Tracy et al. ................... 250/204 |

* cited by examiner

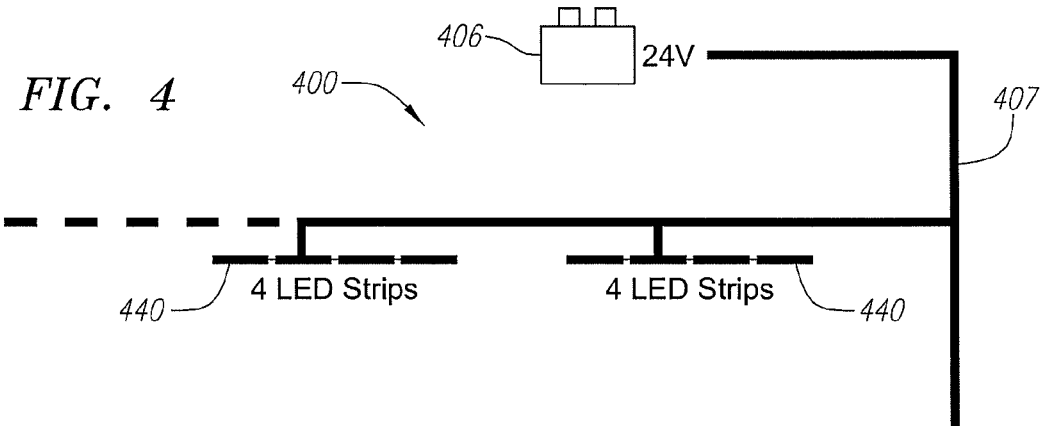
FIG. 4
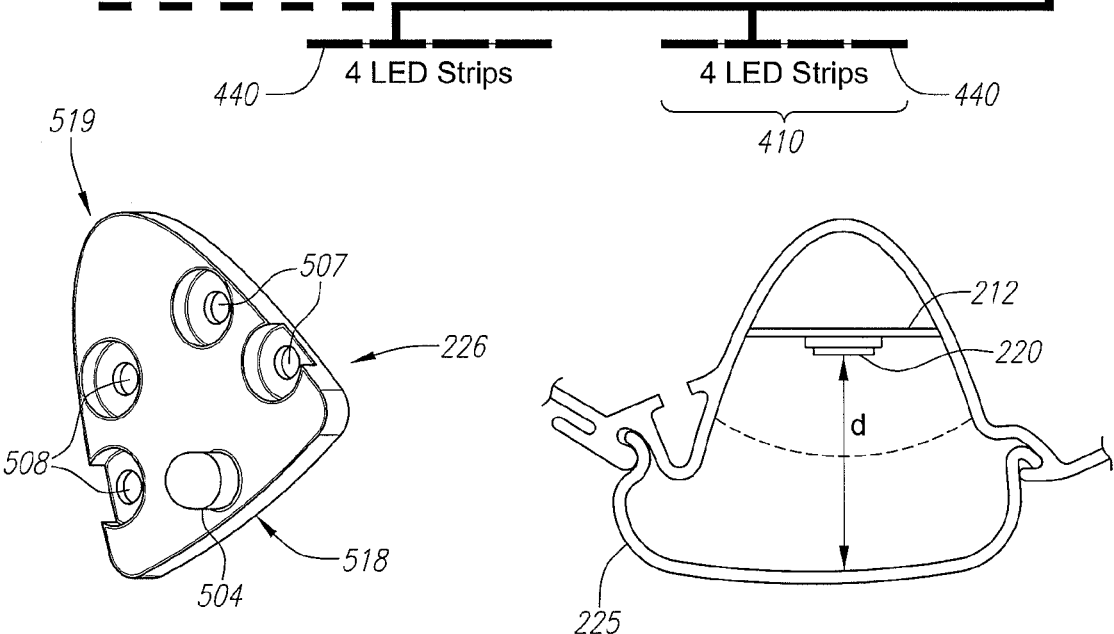
FIG. 5
FIG. 6
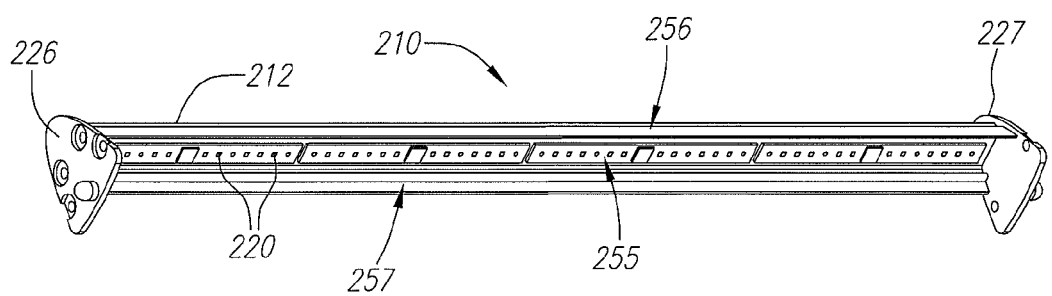
FIG. 7

LED-BASED LIGHTING SYSTEM FOR RETROFITTING FLUORESCENT LIGHTING FIXTURES IN A TRANSIT VEHICLE

BACKGROUND OF THE INVENTION

1) Field of the Invention

The field of the present invention generally relates to lighting systems and, more particularly, to interior lighting systems used in transit vehicles or conveyances such as buses, lightrail cars, and the like.

2) Background

Transit vehicles and similar conveyances typically rely on fluorescent lighting to provide illumination, in part because of the historical efficiency of such lighting as compared to, e.g., incandescent lighting. However, fluorescent lighting has drawbacks and limitations.

For example, fluorescent lights have a relatively short lifetime and a high current draw as compared to some other types of lighting, and in particular in comparison with light-emitting diodes (LEDs). In a typical setting, the fluorescent lights receive power from the transit vehicle's battery, which is usually 24 volts, the output of which is "chopped" to provide an alternating current source. The nature of fluorescent lights leads to high electro-magnetic fields, making compatibility with other electrical equipment challenging. Fluorescent lights also often have problems with arcing, which in turn can pose fire dangers or else blow out electrical components and/or cause power ripples.

In addition, fluorescent lighting is not very amenable to flexible control, and can be difficult to dim. For example, if the fluorescent lamp filaments get too cool when attempting to dim the lamp, then the lamp may simply go out. If current continues to flow while the electrodes are at an improper temperature, then severe rapid degradation of the filaments is possible.

Recently, attempts have been made to incorporate LED lights into transit vehicles, in order to overcome some of the drawbacks of fluorescent lighting systems and/or to obtain certain other benefits. Some of these attempts have involved retrofitting existing fluorescent lighting fixtures to utilize LEDs. Typically, this type of retrofitting is accomplished by replacing the fluorescent light tube with a tube-shaped LED fixture having a strip of LEDs surrounded by an opaque glass tube, fitting into the electrical pin connectors that formerly supplied power and physical support to the fluorescent light tube. While this technique may allow for the replacement of fluorescent light tubes with LEDs, it still has drawbacks. For example, the light quality of such fixtures may not be ideal. Also, despite attempts to mask them, the LEDs still generally appear as visible point sources, which is undesirable. In addition, the LEDs may generate a large amount of heat and lead to safety issues or significantly reduced life expectancy.

It would therefore be advantageous to provide a lighting system for a transit vehicle or conveyance, which overcomes one or more of the disadvantages or limitations of conventional lighting systems. It would further be advantageous to provide an LED-based lighting unit that may readily serve to retrofit existing fluorescent lighting in transit vehicles, buses and other conveyances. It would further be advantageous to provide a lighting system which is inexpensive, has improved life expectancy and/or reduced power consumption, requires less wiring, is relatively easy to control, and/or has other benefits and advantages not found in conventional transit vehicle lighting systems.

SUMMARY OF THE INVENTION

The invention is generally directed in one aspect to an LED lighting unit that is particularly well suited for retrofitting existing fluorescent lighting in a transit vehicle or similar conveyance, but which may find other uses or applications as well. According to one embodiment as disclosed herein, an LED-based lighting unit for a transit vehicle comprises, among other things, a concave structure for fitting snugly into the cavity used for a fluorescent lighting fixture, connector pins on either end of the structure for securing the housing within the cavity, a plurality of LED modules for illuminating an area of a transit vehicle, a power adapter for receiving and converting an input power supply signal, and a diffusive lens cover. The LED modules may be connected in daisy chain fashion along the length of the lighting unit.

In various forms and embodiments, the structure may take the form of an elongate fixture frame having a heat conductive mounting surface on which LEDs are disposed. The elongate fixture frame may have rear fins or other features for facilitating dissipation of heat generated by the LEDs. The fixture frame may also have rear channels or grooves for running wires from the power adapter to the LED module(s), while maintaining a snug fit of the structure within the cavity. The lighting unit may also have one or more manual switches for selecting one of several discrete light intensity or dimmable settings.

In other embodiments, the LED lighting unit may include a temperature sensor and temperature feedback control for reducing the intensity of the LEDs when the ambient temperature reaches a given threshold. The reduction in output may be accomplished by, for example, reducing a duty cycle of a pulse width modulated (PWM) waveform supplying the LEDs.

Further embodiments, variations and enhancements are also disclosed herein.

BRIEF DESCRIPTION OF THE DRAWINGS

FIG. 4 is a conceptual electrical schematic diagram illustrating multiple LED-based lighting fixtures receiving power from an on-board battery in a transit vehicle.

FIG. 5 is an oblique view diagram of an endwall of the retrofit lighting unit illustrated in FIG. 2, having a mounting pin on the outside.

FIG. 6 is a partial close-up cross-sectional diagram of the LED-based lighting unit of FIG. 2, illustrating a distance from an LED array to a lens cover.

FIG. 7 is an oblique view diagram showing the components of FIG. 3 assembled into a unit.

DETAILED DESCRIPTION OF PREFERRED EMBODIMENT(S)

According to various embodiments as disclosed herein, an LED-based lighting fixture and system particularly well suited for retrofitting a fluorescent light panel in a transit vehicle may comprise, for example, one or more of: (i) a concave structure or other mounting structure for fitting snugly into the cavity ordinarily used for a fluorescent lighting fixture, (ii) connector pins on either end of the structure for securing it within the fluorescent lighting fixture cavity, (iii) a plurality of LED modules affixed to heat conductive mounting surface of the structure for illuminating an area of a transit vehicle, (iv) a power adapter for receiving and converting an input power supply signal, (v) a temperature sensor and control circuitry for adjusting the brightness of the LED output when the detected temperature reaches a certain threshold; (vi) a manual brightness setting for further adjusting the brightness of the LED output; and (vii) a diffusive lens cover. The LED modules may be connected in daisy chain fashion along the length of the lighting unit. In certain embodiments, the frame structure or mounting structure may have rear fins or other features for facilitating dissipation of heat generated by the LEDs. The structure may also have rear channels or grooves for running wires from the power adapter to the LED module(s), while maintaining a snug fit of the structure within the cavity. The lighting unit may also have one or more manual switches for selecting one of several discrete light intensity or dimmable settings.

Figure 1:
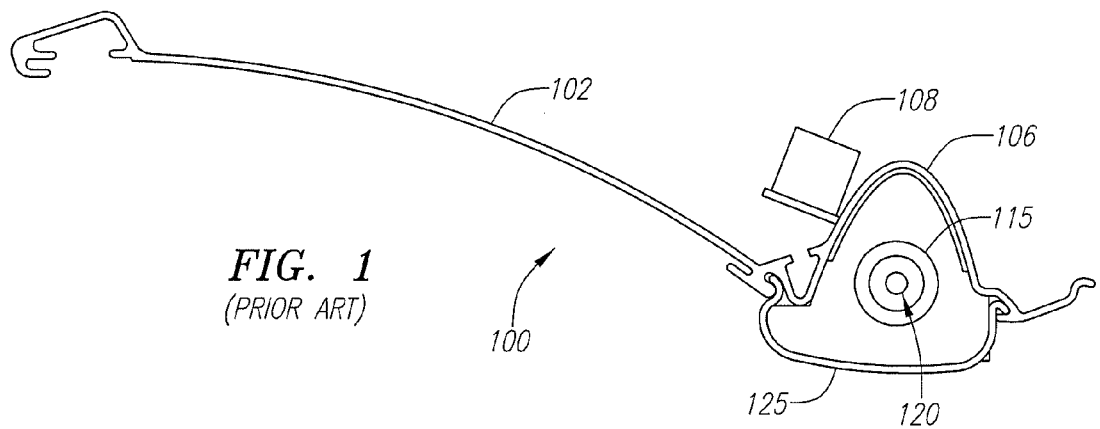
FIG. 1 is a cross-sectional diagram showing an example of a fluorescent lighting system for a transit vehicle as commonly known in the art.

FIG. 1 is a side view cross-sectional diagram showing an example of a fluorescent lighting system 100 for a transit vehicle as commonly known in the art. As illustrated in FIG. 1, a cornice panel region of a transit vehicle includes a generally concave cavity area 106, generally parabolic in shape, defined by the walls of the outer cornice panel housing, and a riser panel 102 extending from the concave cavity area 106 towards the ceiling of a transit vehicle. (The cornice panel area housing in FIG. 1 is not necessarily shown from its normal angle with respect to the horizontal plane, but rather is tilted slightly downward with respect to its normal orientation). The fluorescent lighting unit 100 further includes sockets on either side for receiving pins (such as 120 shown on the near side) on either end of a fluorescent light tube 115. The pins 120 conduct electricity from a power source (such as the vehicle battery) to the fluorescent light tube 115, via a ballast 108 generally located around the mid-section of the concave cavity area 106. A detachable lens 125 (which typically comprises separate lens elements to direct light away from windows) is mounted to tabs along the outer edges of the concave cavity area 106. The lens 125 is generally clear so as to maximize the amount of light provided to the interior of the transit vehicle.

As observed earlier, fluorescent lights have a number of drawbacks and shortcomings, including a relatively short lifetime, high current draw (as compared to certain other types of lighting), high electro-magnetic fields, and problems with arcing leading to fire dangers or else blow out electrical components and/or cause power ripples. In addition, fluorescent lights are not very amenable to flexible control, and can be difficult to dim.

Figure 2:
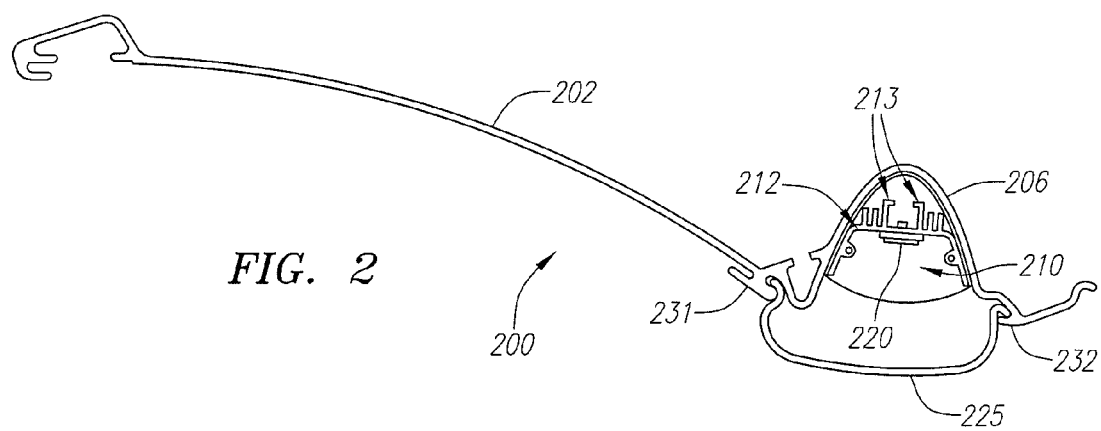
FIG. 2 is a cross-sectional diagram of an embodiment of an LED-based lighting system for retrofitting a fluorescent lighting panel in a transit vehicle.

FIG. 2 is a side view cross-sectional diagram of an LED-based lighting system 200 for retrofitting a fluorescent lighting panel in a transit vehicle, according to one embodiment as disclosed herein. Additional illustrations of the LED-based lighting system 200 and its constituent components are provided in FIGS. 3, 5, 7 and 8. FIG. 7 in particular shows an oblique view of certain details of an LED-based lighting fixture frame 210 having a transverse frame member 212 terminated on either end with sidewall endpieces 226, 227. The transverse frame member 212 preferably comprises heat-dissipating material (such as metal) and may be formed, for example, using aluminum extrusion. Sidewall endpiece 226 is depicted in more detail in FIG. 5, and, as shown therein, preferably has a slightly curved front edge 518 and a convex tapered back edge 519, generally parabolic in shape, having a curvature designed to fit snugly within the concave cavity area 106 of a fluorescent light tube panel housing. As also illustrated in FIG. 5, the sidewall endpiece 226 has a pin 504 for insertion into existing sockets of a fluorescent light fixture, and screw holes 507, 508 for affixing the sidewall endpiece 226 to the end of the transverse frame member 212. The pin 504 is not electrically connected to the lighting elements of the LED-based lighting unit 200 and therefore need not be conductive. Pin 504 is preferably rigid so that the LED-based lighting fixture frame 210 may be conveniently mounted within the existing sockets of a fluorescent light fixture, as would be a fluorescent light bulb, as such sockets are typically spring-loaded so that they flex outwards when a fluorescent tube is inserted, and then snap back into place after insertion. Pin 504 may alternatively be spring-loaded, if deemed necessary. Sidewall endpiece 227 is similar to sidewall endpiece 226, but reversed so that the pin 504 and holes 507, 508 would be on the other side.

Figure 3:
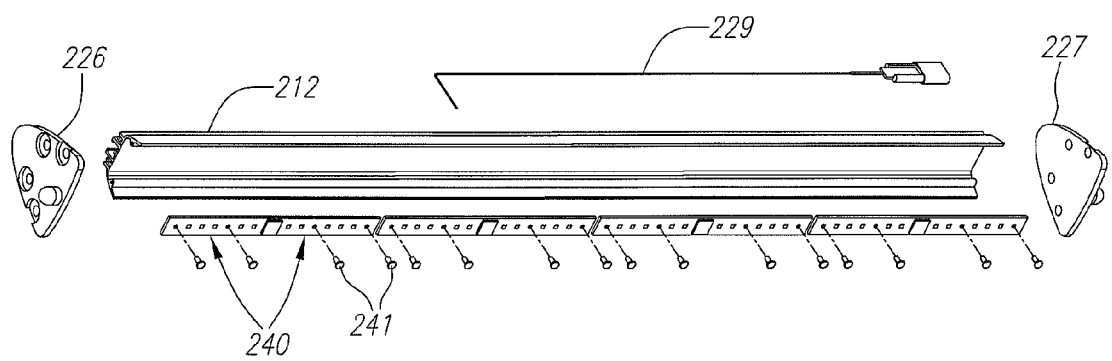
FIG. 3 is an exploded view diagram showing selected components of the LED-based lighting unit frame in FIG. 2.

FIG. 3 is an exploded view diagram showing selected components of the LED-based lighting fixture frame 210 of FIG. 7. FIG. 3 illustrates, among other things, the transverse frame member 212 and sidewall endpieces 226, 227, as well as LED strips 240 (in this example there are eight LED strips 240, but there can be any number depending upon their size and the length of the transverse frame member 212), screws 241 for fixably attaching the LED strips 240 to the transverse frame member 212, and a power cable 229 for providing power to the LEDS of the LED strips 240. The power cable 229 may be covered with an insulated tube (not shown) to provide additional protection from localized heat. As shown in FIG. 3 and also in FIG. 7, the transverse frame member 212 preferably includes a frame backwall 255 having a front surface on which the LED strips 240 are mounted, and angled frame sidewalls 256, 257 extending from the frame backwall 255 and serving the partial purpose of sealing the cavity 106 of the fluorescent lighting tube panel housing along its top and bottom edges. The backwall 255 and angled frame sidewalls 256, 257 may be formed of a metal or other heat-dissipating material (such as aluminum), and may be formed as a single integral component or else may be assembled from multiple pieces.

The side view cross-sectional diagram of FIG. 2 illustrates placement of the LED-based lighting fixture frame 210 within a concave cavity 206 (same as 106 in FIG. 1) of a fluorescent lighting panel in a transit vehicle, according to one embodiment. As shown in FIG. 2, the transverse frame member 212 of the lighting fixture frame 210 rests snugly within the concave cavity 206 where previously a fluorescent tube light (such as 115 in FIG. 1) would have been positioned. The angled frame sidewalls 256, 257 (see FIG. 7) are angled with respect to the frame backwall 255 of the transverse frame member 212 so that they generally match the contour of the tapering walls of the concave cavity 206. The spread of the angled frame sidewalls 256, 257 is selected so that at least their edges rest snugly on the walls of the concave cavity 206, helping to seal the part of the cavity 206 behind the lighting fixture frame 210. Similarly, the contoured edges of the sidewall endpieces 226, 227 (see FIGS. 3, 5 and 7) is selected to match the contour of the concave cavity 206, thereby providing a snug fit of the entire lighting fixture frame 210 in the cavity 206. Preferably, the lighting fixture frame 210 and the sidewall endpieces 226, 227 are bordered with a foam sealant placed around the outer edges, to help seal the cavity behind the lighting fixture frame 210 when it is inserted in place.

As further illustrated in the cross sectional view of FIG. 2, the frame backwall 255 of the transverse frame member 212 spans horizontally (in this view) across the parabolic curvature of the concave cavity 206. The transverse frame member 212 provides a rigid platform for the LEDs 220, which are directed outwards as indicated in FIG. 2. Also shown in FIG. 2 are heat-dissipating fins 213 which are integrally formed with the frame backwall 255 of the transverse frame member 212. In a preferred embodiment, the center fins 213 form a groove for placement of a power cable 229 (see FIG. 3) which may be run from the vehicle's main power source connection to one (or more) of the LED strips 240. Power lines may be connected to each LED strip 240 individually, running along the back of the transverse frame member 212, or else power lines may be run along the front of the transverse frame member to each of the individual LED strips 240, which preferably are connected in parallel, each receiving the same input source voltage.

FIG. 2 also shows placement of a specialized semi-opaque lens cover 225 that may be inserted into lens clips 231, 232 similar to conventional fluorescent light lenses. However, lens cover 225 preferably comprises a diffusion element, or is made of light-diffusing material, thereby obscuring the LEDs as point light sources and providing a more pleasing light distribution to the interior of the transit vehicle. In this embodiment, the fact that the LEDs 220 are placed deep in the cavity 206, relatively far away from the lens cover 225, allows the LED light to expand further and thus allows the lens cover 225 to provide a more diffuse output than would otherwise be possible if the LEDs were positioned at the location of the fluorescent tube 115 (see FIG. 1), that is, roughly in line with the fluorescent tube sockets. This concept is illustrated in FIG. 6, which highlights the relatively long distance d from the LEDs 220 to the lens cover 225.

The lens cover 225 may be formed of semi-frosted white glass or high-impact plastic, and optionally may be blue-tinted. In a preferred embodiment, the lens cover transmits approximately 45% to 65% of the light output from the LEDs 220 and, more preferably, transmits approximately 50%-55% of the light output from the LEDs 220. While the lens cover 225 thus reduces the amount of light, it also evens the spread of light, reducing the visibiliity of the LEDs 220 as point light sources, and provides an aesthetically pleasing effect. In a preferred embodiment, where the LEDs 220 are embodied as 1 Watt LEDs, the distance d from the LEDs 220 to the lens cover 225 is preferably approximately 2". For lower power LEDs (e.g., ½ Watt), the lens cover 225 may preferably be placed approximately 1.5" away from the LEDs 220. The use of 1 Watt LEDs allows the LEDs 220 to be placed further apart and necessitates the use of fewer LEDs 220 for adequate light output.

Experiments have shown that with ½ Watt LEDs spaced approximately 1.7" apart along the length of the transverse frame member 212 (i.e., 7 LEDs 220 per one foot section), the total light output with a 28 Volt supply is approximately 1815 lumens. Placement of a semi-opaque lens cover 225 approximately 2" away from the LEDs 220 will adequately spread the LED light and shield visibility of the LEDs 220 as point light sources when the lens transmissivity is under about 65%.

The semi-opaque lens cover 225 may be made of a polycarbonate material, and preferably meets DOC-90 requirements for transit vehicles. Unlike fluorescent light lens covers, the lens cover 225 used in connection with the LED-based lighting fixtures described herein do not require grooves or striations which are used to focus light away from the windows of the vehicle, and thus may be formed with a smooth inner surface. However, the lens cover 225 may be provided with grooves or striations if desired.

Figure 8:
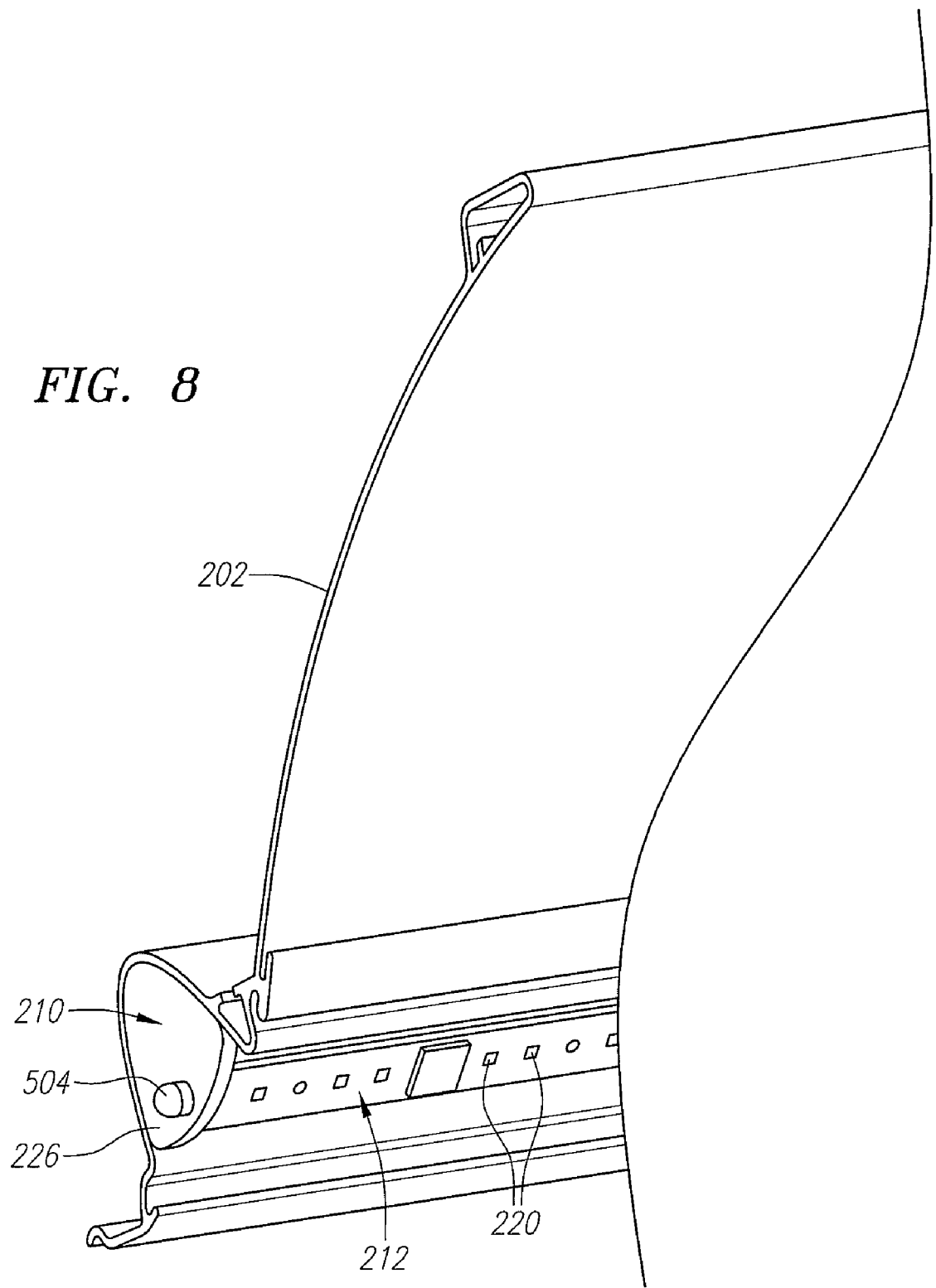
FIG. 8 is a partial oblique view diagram showing the LED-based lighting unit of FIG. 2 positioned in a panel area previously used for a fluorescent light in a transit vehicle.

FIG. 8 is a partial oblique view diagram showing the LED-based lighting unit 210 of FIG. 2 positioned in a panel area previously used for a fluorescent light in a transit vehicle. As shown in FIG. 8, the sidewall endpiece 226 is contoured to fit snugly along the curved backwall of the cavity 206 of the fluorescent light panel area, with the pin 504 shown where it would attach securably to the socket of the fluorescent light panel area.

FIG. 4 is a conceptual electrical schematic diagram illustrating multiple LED-based lighting fixtures 410 receiving power from an on-board battery 406 in a transit vehicle. Typically, transit vehicle batteries provide a voltage output in the range of 24 Volts. The vehicle power supply cable 407 is provided along right and left banks of LED-based lighting fixtures 410 (for right and left sides of the transit vehicle). Each of the LED strips 440 in each LED-based lighting fixture 410 is thereby supplied with power. While FIG. 4 illustrates four LED strips 440 for each LED-based lighting fixture 410, any number of LED strips 440 may be used, depending upon the desired dimensions of the LED-based lighting fixture 410. Each LED strip 440 is preferably just under 1' in length, and may for example be approximately 11" in length, so that different size lighting fixtures 410 (of, e.g., 2', 4' or 6' in length) can be readily built up using different numbers of the LED strips 440. According to one embodiment, each LED strip 440 has 7 LEDs, each rated at 1 Watt (although other LED sizes and number of LEDs may be chosen). The LED strips 440 are preferably connected in parallel so that each is provided with the same level of power (e.g., 24V) from the vehicle power supply cable 407.

Figure 9A:
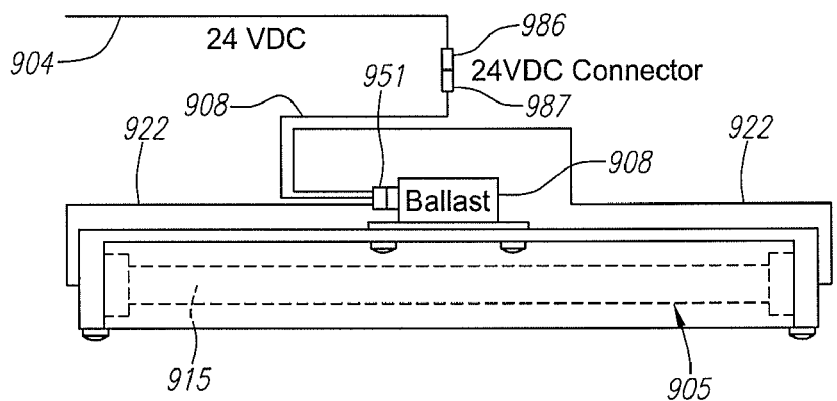
FIGS. 9A-9C are diagrams illustrating the removal of an existing fluorescent light tube in a transit vehicle and its replacement with an LED-based lighting fixture and system designed to be compatible with the existing fluorescent light mounting structure.
Figure 9B:
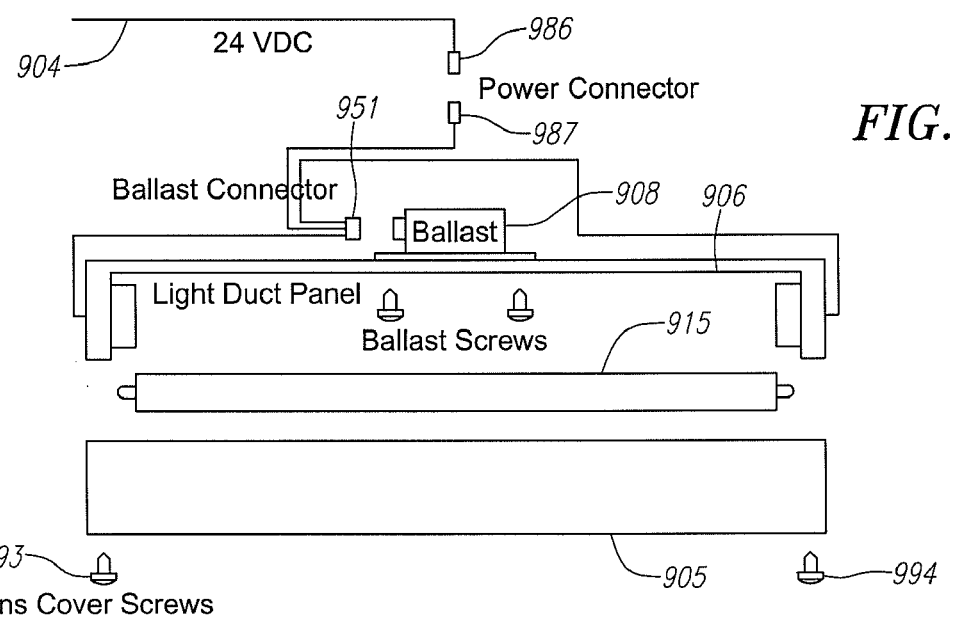
Figure 9C:
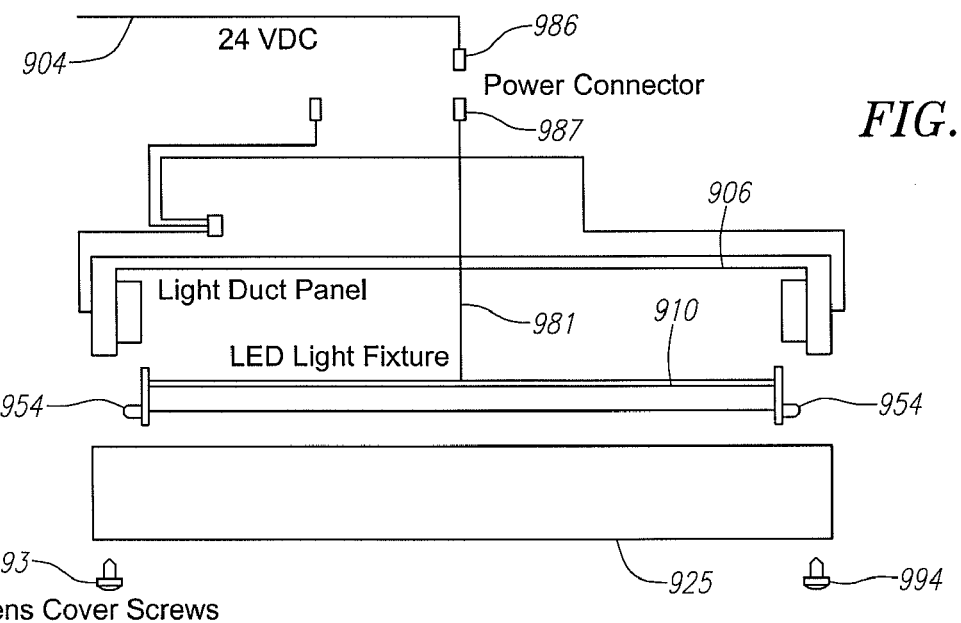

FIGS. 9A-9C are diagrams illustrating the removal of an existing fluorescent light tube in a transit vehicle and its replacement with an LED-based lighting unit designed to be compatible with the existing fluorescent light mounting structure. As shown first in FIG. 9A, a fluorescent tube light 915 is positioned in a cavity of a fluorescent lighting panel area, held in place and provided with power via electrical sockets at either side. A fluorescent lamp lens 905 is securably positioned in the lighting panel area, held in place by tabs and possibly by screws as well. Vehicle supply power cable 904 terminates in a connector 986, which fastens to a mating connector 987 of a local power cable 988 that provides the signal to a ballast 908, which regulates the current to the fluorescent tube light 915. Output wires 922 from the ballast 908 connect to the sockets at either end of the fluorescent tube light 915.

To replace the fluorescent tube light 915 with an LED-based lighting system according to one or more embodiments, the lens cover 905 is removed followed by the fluorescent but light 915. The ballast 908 is then loosened, disconnected from the power cable and wires, and removed. The local power cable 988 and power wires 922 may be discarded. Next, the power cable 981 of an LED-based lighting unit 910 (generally of the type illustrated in FIGS. 2, 7 and 8) is connected to the vehicle power cable connector 986 for the particular light panel area. The LED-based lighting unit 910 is then slid into place, with pins 954 inserting into sockets that previously held the fluorescent light tube 915 and provided power thereto. A specialized diffusion lens 925 (as described previously) having a similar size and shape as lens 905 is locked into holding tabs, and if necessary affixed with screws 993, 994. Thus, with minimal effort, the LED-based lighting system including lighting unit 910 and lens cover 925 may replace an existing fluorescent lamp illumination system.

Figure 10:
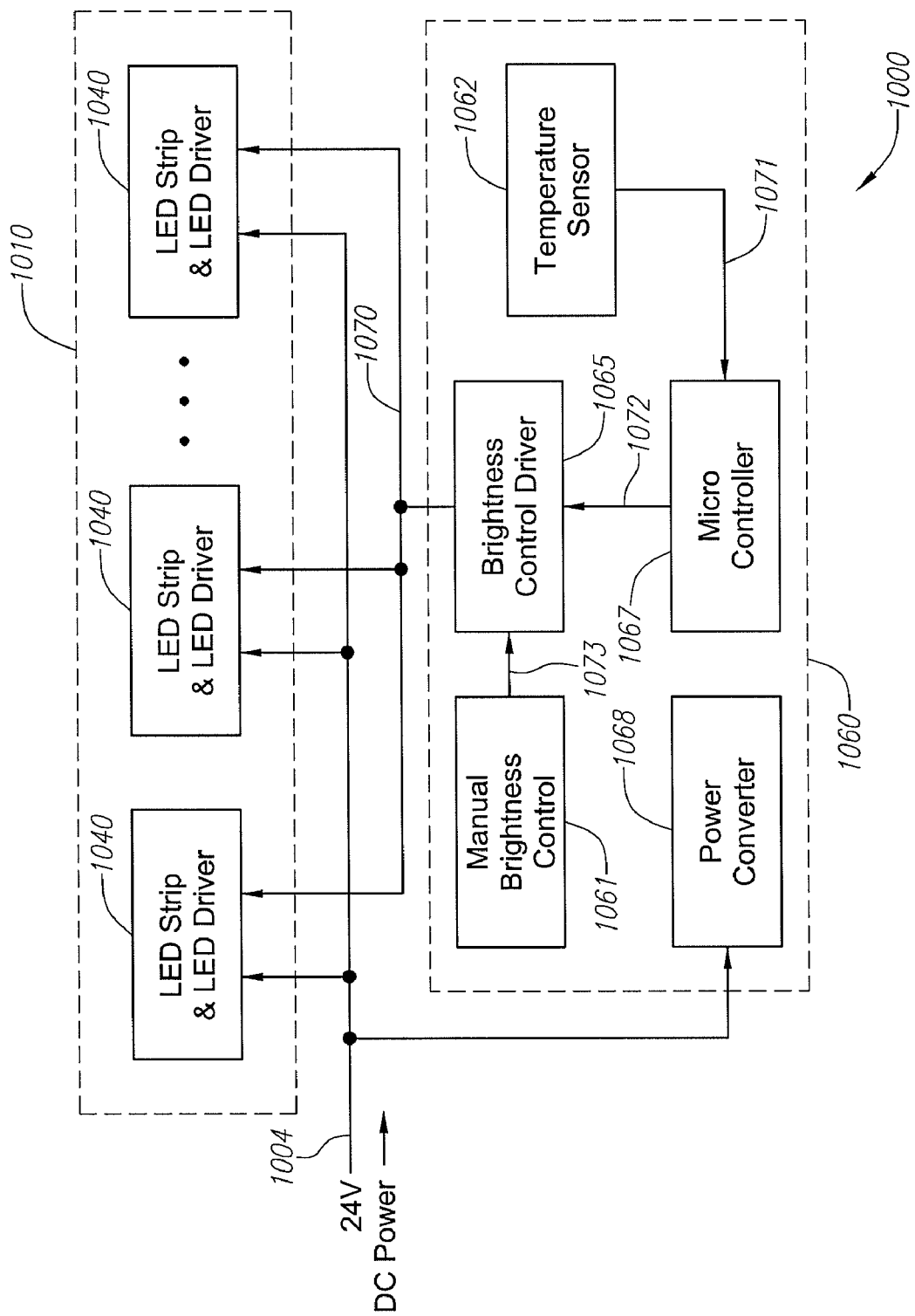
FIG. 10 is a high-level block diagram illustrating details of control electronics for an LED-based lighting unit for use in a transit vehicle.

FIG. 10 is a high-level block diagram illustrating details of control electronics for an LED-based lighting unit for use in a transit vehicle, as may be used in connection with various embodiments as described herein. In FIG. 10, a retrofit LED-based lighting system 1000 includes an LED lighting unit 1010 with one or more LED strips and associated drivers 1040, all of which collectively may be embodied for example as LED-based lighting unit 210 in FIGS. 2 and 7, including lens cover 225, or as any of the other embodiments or variations described herein. The retrofit LED-based lighting system 1000 in FIG. 10 further includes control electronics 1060 that provides the appropriate driving signals for the LEDs along with other desired functions. The control electronics 1060 may reside, for example, on a printed circuit board (PCB) attached to or integral with the transverse frame member 212.

In one embodiment, the control electronics 1060 includes a power converter 1068 for generating low power level (e.g., 5V) suitable for digital electronic circuitry, from an incoming power signal (typically 24V) from the vehicle power bus/cable 1004, which is also supplied to the LED lighting unit 1010. The control electronics 1060 preferably further includes a microcontroller 1067 in communication with a brightness control driver 1065. A temperature sensor 1062 monitors the ambient temperature of the LEDs of the LED lighting unit 1010, and provides a measured temperature output signal 1071 to the microcontroller 1067. The microcontroller 1067 uses the temperature information to adjust the intensity of LEDs via the brightness control driver 1065, by outputting a brightness command signal 1072. In a preferred embodiment, the microcontroller 1067 instructs the brightness control driver 1065 to drive the LEDs at full output (or a selected high output) under normal operation, but then instructs the brightness control driver 1065 to reduce the LED output when a predetermined temperature threshold has been reached. Reduction of the LED output level can be achieved by, for example, reducing a duty cycle of a pulse width modulated (PWM) waveform provided to the LEDs. The predetermined temperature threshold may be selected to be a temperature which would exceed the recommended operating temperature (specifically the junction temperature) of the LEDs or impair the longevity of the LEDs—for example, the temperature threshold may be set to 85° C. or in that approximate range. The microcontroller 1067 may be further programmed to instruct the brightness control driver 1065 to operate the LEDs at the full (or selected high) output after the temperature drops down to a second predetermined temperature threshold, or has been below the first predetermined temperature threshold for a sufficient amount of time.

To achieve an accurate estimation of the LED temperature, the temperature sensor 1062 is preferably located near to the LEDs and may, for example, be physically attached to the backwall 255 of the transverse frame member 212. Temperature buildup may occur in part due to the fact that the back of the transverse frame member 212 is enclosed within a sealed compartment, with minimal or no airflow. In addition, the available heat sink area for the LEDs is limited. Even with heat-dissipating fins on the back of the transverse frame member 212, further means may be desired to ensure that the LEDs do not get excessively hot. On hot days when the transit vehicle is parked outside, the ambient temperature of the lighting fixtures may get quite high. The ability to dynamically reduce the LED intensity, in discrete steps, can provide a significant advantage in terms of temperature control and stability, and in turn lead to substantially increased LED life.

The same concept can be extrapolated with the use of multiple temperature thresholds, whereby the microcontroller 1067 instructs the brightness control driver 1065 to ratchet down the LED brightness level in discrete steps as the temperature increases. Thus, at a first predetermined temperature threshold, the microcontroller 1067 instructs the brightness control driver 1065 to reduce the intensity of the LEDs by a first amount (e.g., to 70% of full value), and at a second higher temperature threshold it instructs the brightness control driver 1065 to reduce the intensity of the LEDs to a lower level (e.g., to 50% of full value), and so on for each higher temperature threshold. In this way, the LEDs can be protected from severely high temperatures and their longevity increased. This can be particularly important in the context of an LED-retrofit fixture, where there is limited space and ventilation, thus posing a risk of high temperatures. As with a single temperature threshold, the microcontroller 1067 may be configured to gradually ratchet the brightness of the LEDs back up when the temperature returns to a sufficiently low level, or has been below the relevant temperature threshold for a sufficient amount of time.

The temperature sensor 1062 may take the form of an off-the-shelf chip, such as, for example, a Motorola MCP9701 chip. The temperature sensor 1062 should have a suitable detection range, such as, for example, 40°-150° C.

The control electronics 1060 may further include a manual brightness control interface 1061, allowing the brightness of the LEDs to be manually set. The manual brightness control interface 1061 may be a simple two-setting switch (high/low), or else may have several discrete settings, each corresponding to a selected brightness level. The manual brightness control interface 1061 preferably provides a brightness selection level signal 1073 to the brightness control driver 1065, which uses this setting information in connection with the brightness command signal 1072 from the microcontroller 1067 in order to set the brightness level for the LEDs of the LED lighting unit 1010. The brightness selection level signal 1073 in effect sets the desired "full" output level for the LEDs, which is then may be reduced if necessary (by percentage levels or in discrete amounts) in response to the brightness command signal 1072 from the microcontroller 1067. According to one embodiment, the manual brightness control interface has four settings, corresponding to 100%, 70%, 50% and 30% of maximum LED brightness.

The brightness control driver 1065 may be embodied in any of a variety of forms as would be apparent to those skilled in the art. For example, the brightness control driver 1065 may In other embodiments, functionality of various components may be integrated in a single physical unit, or else may be distributed in additional physical components or units, as would be recognized by those skilled in the art. As an example, the functionality of the brightness control driver 1065 may be incorporated into the microcontroller 1067.

According to certain embodiments as disclosed herein, an LED-based lighting fixture and system is provided particularly well suited to replacing a fluorescent lighting fixture within a transit vehicle. The LED-based lighting fixture may be constructed so as to allow relatively quick and simple installation, whereby an LED mounting frame can be rapidly inserted into the existing sockets previously used to hold a fluorescent light tube, without the need for additional fasteners. Preferably the pins of the LED mounting frame are used to hold the LED unit on the fixture panel and are not used for transmitting electricity to the LEDs. Rather, power and control signals for the LEDs are provided via cable connection(s) on the back of the LED mounting frame. In addition to rapid and simple retrofitting, the LED-based lighting fixture may provide other benefits and advantages, including longer lifetime, improved light quality and evenness, and increased flexibility. Because the LED-based fixture is preferably designed to match the contours of the fluorescent light panel housing, it reduces vibration and noise as well. Other benefits, particularly in comparison with conventional fluorescent lights, include no or minimal EMI emissions, no ballast requirement, and no mercury content—all of which can be significant disadvantages of fluorescent lighting systems.

The retrofit LED-based fixture may be provided in different "standard" lengths such as 2', 4' and 6', for example, allowing retrofitting of any sized fluorescent lighting fixture commonly used in transit vehicles.

According to one or more embodiments as disclosed herein, an LED-based lighting unit for retrofitting a fluorescent light fixture in a transit vehicle is provided, the LED-based lighting unit comprising an elongate fixture frame (such as 210 in FIG. 2) securably attachable within a concave fluorescent lighting fixture cavity of a transit vehicle, the cavity having left and right electrical sockets for supporting and providing power to a fluorescent tube light. In a preferred embodiment, the elongate fixture frame substantially conforms to the shape of the concave cavity so that it fits snugly therein. The elongate fixture frame may be formed by an aluminum extrusion process, and may have left and right pins extending therefrom for securably attaching the structure to the left and right sockets within the fluorescent lighting fixture cavity. The elongate fixture frame may have a heat conductive mounting surface, with a plurality of light-emitting diodes (LEDs) disposed along its length for illuminating an interior area of the transit vehicle. A removably attachable diffusive lens cover attaches to an output opening of the fluorescent lighting fixture cavity.

The elongate fixture frame may comprise a transverse frame crossbeam spanning across the length of the fluorescent lighting fixture cavity, and right and left sidewalls disposed at either end of the transverse frame crossbeam. The right and left sidewalls may respectively support the left and right pins which insert into the sockets on either side of the cavity, and may be contoured so as to rest snugly within and against the inner walls of the cavity when the elongate fixture frame is securably attached therein.

The elongate fixture frame may further include heat dissipating fins along its backside, in thermal communication with the heat conductive mounting surface, for dissipating heat generated by the LEDs. A seal of compressible material may be disposed along the peripheral edges of the elongate fixture frame, contacting one or more of the inner walls of the cavity when the elongate fixture frame is positioned therein, thus forming a sealed compartment behind the elongate fixture frame (as shown for example in the cross-sectional side view of FIG. 2). The elongate fixture frame may include a power cable attachably connectable to a DC power bus carrying a power signal derived from an on-board transit vehicle battery, and may further have grooves along its backwall for holding and guiding the power cable. The power cable may exit through the ballast opening to connect to the DC power bus of the transit vehicle.

The LEDs on the heat conductive mounting surface are preferably rated at approximately 1 Watt or more, although they may be of lesser power (e.g., ½ Watt) or higher power. The LEDs may be arranged in a substantially linear pattern along the surface of the heat conductive mounting surface. A manual brightness control switch with a plurality of settings may be disposed on the elongate fixture frame. The manual brightness control may be operative to adjust a light output level from the LEDs to any of a plurality of discrete light output levels based upon a selected setting. The manual brightness control switch may output a brightness selection signal having a plurality of discrete values to a control circuit, with each of the discrete values corresponding to a respective predetermined duty cycle for a pulse width modulated waveform provided to the LEDs.

The diffusive lens cover preferably permits between 45% and 65% of light output to pass through, and more optimally permits between 50% and 55% of light to pass through. Where the LEDs are rated at 1 Watt in power, the diffusive lens cover may be positioned approximately 2 inches from the LEDs. The LEDs may be divided into a plurality of LED modules each having the same number of LEDs, with all of the LED modules connected in parallel, and thus all receiving the same input voltage signal.

The LED-based lighting unit may further include a temperature sensor in thermal communication with the heat conductive mounting surface. A temperature reading output from the temperature sensor may be provided to a controller, which, in response thereto, outputs commands to a brightness control driver in order to reduce the intensity of light output from the LEDs when the temperature reading exceeds a predetermined threshold. The controller may also adapted to further reduce the intensity of light output from the LEDs when the temperature reading from the temperature sensor exceeds a second predetermined threshold higher than the first predetermined threshold, by further adjusting the voltage signal (and specifically, the duty cycle thereof) supplied to the LEDs.

Also disclosed herein, according to various embodiments, is a method for retrofitting a fluorescent light fixture in a transit vehicle with an LED-based lighting system, by first removing the fluorescent tube light from the fluorescent lighting fixture cavity in a transit vehicle. The cavity will have left and right electrical sockets that were used for supporting and providing power to the fluorescent tube light. The right and left electrical sockets are typically connected to a ballast having a cable connector connected to a mating DC power bus connector of the transit vehicle. The method includes the step of disconnecting the incoming power to the left and right electrical sockets by removing a ballast and disconnecting the cable connector from the DC power bus connector of the transit vehicle, thus leaving an opening from the fluorescent light fixture cavity into a duct of the transit vehicle.

The method further involves retrofitting the fluorescent tube light with an LED-based lighting unit, by securably attaching an elongate fixture frame of the type previously described within the fluorescent lighting fixture cavity. The elongate fixture frame preferably substantially conforms to the shape of the cavity so that it fits snugly therein and has left and right pins extending from either end thereof, for insertion into the left and right sockets of the fluorescent lighting fixture cavity to provide support for the elongate fixture frame. The elongate fixture frame further preferably includes a local power cord exiting a backside of the elongate fixture frame and terminating in a local power cord connector compatible with the DC power bus connector. Power to the LEDs may be provided by connecting the local power cord connector of the elongate fixture frame to the DC power bus connector through the opening of the cavity remaining after removing the ballast associated with the fluorescent lighting fixture.

The method of retrofitting may further include attaching a removable diffusive lens cover to an opening of the fluorescent lighting fixture cavity. The removable diffusive lens cover is positioned at a distance sufficiently far from the LEDs, and has appropriate opaqueness and diffusive qualities, so that the light from the LEDs has sufficient time to spread and be affected by the diffusion properties of the diffusive lens cover, thus providing the illusion of a planar light source (as opposed to numerous point light sources). This effect generally results in a more pleasing and comfortable lighting environment for the passengers of the transit vehicle.

The novel techniques described herein could have applicability beyond transit vehicles, and may be used, for example, in connection with other types of vehicles, or with lighting systems in buildings, factories, and other facilities.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. An LED-based lighting unit for retrofitting a fluorescent light fixture in a transit vehicle, the LED-based lighting unit comprising:
    an elongate fixture frame securably attachable within a fluorescent lighting fixture cavity of a transit vehicle, said cavity having left and right electrical sockets for supporting and providing power to a fluorescent tube light, wherein the elongate fixture frame substantially conforms to the shape of the cavity so that it fits snugly therein;
    left and right non-conductive pins extending from the elongate fixture frame, said left and right non-conductive pins securably attaching the elongate fixture frame to the left and right sockets within the fluorescent lighting fixture cavity;
    a heat conductive mounting surface on the elongate fixture frame;
    a plurality of light-emitting diodes (LEDs) disposed along a length of said heat conductive mounting surface, for illuminating an interior area of the transit vehicle; and
    a diffusive lens cover removably attachable to an output opening of the fluorescent lighting fixture cavity.

2. The LED-based lighting unit of claim 1, further comprising heat dissipating fins along a backside of said elongate fixture frame and in thermal communication with said heat conductive mounting surface, for dissipating heat generated by said LEDs.

3. The LED-based lighting unit of claim 1, further comprising a seal of compressible material disposed along the peripheral edges of said elongate fixture frame, whereby the seal contacts one or more inner walls spanning a lengthwise dimension of said cavity that is substantially coextensive with the length of said elongate fixture frame, when said elongate fixture frame is disposed therein.

4. The LED-based lighting unit of claim 3, wherein:
    a sealed compartment is formed when said elongate fixture frame is disposed within said cavity; and
    said elongate fixture frame further comprises a power cable attachably connectable to a DC power bus carrying a power signal derived from an on-board transit vehicle battery, said elongate fixture frame having grooves along a backwall and within said sealed compartment for guiding said power cable.

5. The LED-based lighting unit of claim 1, wherein said LEDs are rated at approximately 1 Watt or more.

6. The LED-based lighting unit of claim 1, further comprising a manual brightness control switch disposed on said elongate fixture frame and having a plurality of settings, said manual brightness control operative to adjust a light output level from said LEDs to any of a plurality of discrete light output levels based upon a selected setting.

7. The LED-based lighting unit of claim 6, wherein said manual brightness control switch provides a brightness selection signal having a plurality of discrete values, each value corresponding to a respective predetermined duty cycle for a pulse width modulated waveform provided to said LEDs.

8. The LED-based lighting unit of claim 1, wherein said LEDs are rated at approximately 1 Watt and are arranged in a substantially linear pattern.

9. An LED-based lighting unit for retrofitting a fluorescent light fixture in a transit vehicle, the LED-based lighting unit comprising:
    an elongate fixture frame securably attachable within a fluorescent lighting fixture cavity of a transit vehicle, said cavity having left and right electrical sockets for supporting and providing power to a fluorescent tube light;
    a heat conductive mounting surface on the elongate fixture frame;
    a plurality of light-emitting diodes (LEDs) disposed along a length of said heat conductive mounting surface, for illuminating an interior area of the transit vehicle; and
    a diffusive lens cover removably attachable to an output opening of the fluorescent lighting fixture cavity;
    wherein said diffusive lens cover permits between 45% and 65% of light output to pass through, and is positioned approximately 2 inches from said LEDs.

10. The LED-based lighting unit of claim 1, further comprising:
    a temperature sensor in thermal communication with said heat conductive mounting surface; and
    a controller adapted to receive a temperature reading from said temperature sensor, said controller outputting commands to reduce the intensity of light output from said LEDs when the temperature reading exceeds a predetermined threshold.

11. The LED-based lighting unit of claim 1, wherein said elongate fixture frame is constructed by aluminum extrusion.

12. The LED-based lighting system of claim 1, wherein said elongate fixture frame comprises a transverse frame crossbeam for spanning a length of the fluorescent lighting fixture cavity, and right and left sidewalls disposed at either end of the transverse frame crossbeam, said right and left sidewalls respectively supporting said left and right non-conductive pins and being contoured so as to rest snugly within and against said cavity when the elongate fixture frame is securably attached therein.

13. The LED-based lighting unit of claim 1, wherein said LEDs are divided into a plurality of LED modules each having the same number of LEDs, wherein each of said LED modules receives the same input voltage signal.

14. The LED-based lighting unit of claim 13, further comprising a control circuit disposed on said elongate lighting fixture frame, said control circuit comprising:
    a manual brightness control having a plurality of discrete settings;
    an LED temperature reading input received from a temperature sensor;
    a controller receiving a brightness selection input signal from said manual brightness control and said LED temperature reading input, and outputting a brightness command signal;

a brightness control driver receiving said brightness command signal and adjusting a duty cycle of a pulse-width modulated voltage signal supplied to said LED modules; and a power converter for locally generating a power supply signal suitable for digital electronics from a high-power onboard power bus.

15. A method for retrofitting a fluorescent light fixture in a transit vehicle with an LED-based lighting system, the method comprising:

removing a fluorescent tube light from a fluorescent lighting fixture cavity in a transit vehicle, said cavity having left and right electrical sockets for supporting and providing power to the fluorescent tube light;

disconnecting incoming power to said left and right electrical sockets;

securably attaching an elongate fixture frame within the fluorescent lighting fixture cavity, said elongate fixture frame substantially conforming to the shape of the cavity so that it fits snugly therein and having left and right non-conductive pins extending from either end of the elongate fixture frame, said left and right non-conductive pins being thereby disposed within the left and right sockets of the fluorescent lighting fixture cavity to provide support for said elongate fixture frame; and attaching a removable diffusive lens cover to an opening of the fluorescent lighting fixture cavity;

wherein said elongate fixture frame comprises a heat conductive mounting surface on the elongate fixture frame and a plurality of light-emitting diodes (LEDs) disposed along a length of said heat conductive mounting surface for illuminating an interior area of the transit vehicle.

16. The method of claim 15, wherein said diffusive lens cover diffuses light output from said LEDs to create an illusion of a planar light source.

17. The method of claim 15, wherein said right and left electrical sockets are connected to a ballast having a cable connector connected to a mating DC power bus connector of the transit vehicle, and wherein the step of disconnecting the incoming power to said left and right electrical sockets comprises removing a ballast and disconnecting the cable connector from the DC power bus connector of the transit vehicle, wherein removing the ballast leaves an opening from the cavity into a duct of the transit vehicle;

wherein said elongate fixture frame further comprises a local power cord exiting a backside of said elongate fixture frame and terminating in a local power cord connector compatible with the DC power bus connector;

said method further comprising:

connecting said local power cord connector of the elongate fixture frame to the DC power bus connector through the opening of the cavity remaining after removing the ballast.

18. The method of claim 17, wherein said elongate fixture frame has grooves along its backside for guiding said power cable.

19. The method of claim 15, wherein said elongate fixture frame further comprising heat dissipating fins along a backside thereof and in thermal communication with said heat conductive mounting surface, for dissipating heat generated by said LEDs.

20. The method of claim 15, wherein said elongate fixture frame further comprises a seal of compressible material disposed along the peripheral edges thereof, whereby the seal contacts one or more inner walls spanning a lengthwise dimension of said cavity that is substantially coextensive with the length of said elongate fixture frame, when said elongate fixture frame is disposed therein.

21. The method of claim 19, wherein a sealed compartment is formed when said elongate fixture frame is disposed within said cavity.

22. The method of claim 15, wherein said LEDs are rated at approximately 1 Watt or more.

23. The method of claim 15, further comprising selecting a setting of a manual brightness control switch disposed on said elongate fixture frame, said manual brightness control having a plurality of settings operative to adjust a light output level from said LEDs to any of a plurality of discrete light output levels based upon the selected setting.

24. The method of claim 23, wherein said manual brightness control switch provides a brightness selection signal having a plurality of discrete values to a control circuit, each value corresponding to a respective predetermined duty cycle for a pulse width modulated waveform provided to said LEDs.

25. The method of claim 15, wherein said LEDs are rated at approximately 1 Watt and are arranged in a substantially linear pattern.

26. The method of claim 25, wherein said diffusive lens cover permits between 45% and 65% of light output to pass through, and is positioned approximately 2 inches from said LEDs.

27. The method of claim 15, further comprising:

obtaining a temperature reading from a temperature sensor in thermal communication with said heat conductive mounting surface; and providing the temperature reading to a controller; and outputting commands from the controller causing the intensity of light output from said LEDs to be reduced when the temperature reading exceeds a predetermined threshold.

28. The method of claim 27, wherein said LEDs are dimmed by reducing a duty cycle of a pulse width modulated voltage signal provided to said LEDs.

29. The method of claim 15, wherein said LEDs are divided into a plurality of LED modules each having the same number of LEDs, wherein each of said LED modules receives the same input voltage signal.

30. An LED-based lighting fixture for a transit vehicle, comprising:

an elongate fixture frame securably attachable within a concave fluorescent lighting fixture cavity of a transit vehicle, the elongate fixture frame substantially conforming to the cavity such that it fits snugly therein;

a heat conductive mounting surface on the elongate fixture frame;

a plurality of light-emitting diodes (LEDs) disposed along a length of said heat conductive mounting surface, for illuminating an interior area of the transit vehicle;

a temperature sensor in thermal communication with said heat conductive mounting surface; and a control circuit adapted to receive a temperature reading from said temperature sensor, said control circuit operable to adjust a pulse width modulated signal supplied to said LEDs, whereby said control circuit causes an intensity of light output from said LEDs to be reduced when the temperature reading exceeds a first predetermined threshold.

31. The LED-based lighting unit of claim 30, wherein said control circuit is operable to adjust a duty cycle of said pulse width modulated signal in order to adjust the amount of current supplied to the LEDs and thereby reduce or increase the intensity of light output therefrom.

32. The LED-based lighting unit of claim 30, wherein said control circuit is adapted to further reduce the intensity of light output from said LEDs when the temperature reading exceeds a second predetermined threshold higher than said first predetermined threshold, by further reducing the duty cycle of said pulse width modulated signal supplied to said LEDs.

33. An LED-based lighting unit for retrofitting a fluorescent light fixture in a transit vehicle having a fluorescent light compartment with left and right walls, said left and right walls having left and right electrical sockets capable of supporting and providing power to a fluorescent tube light, the LED-based lighting unit comprising:

an elongate fixture frame;

left and right non-conductive pins extending from the elongate fixture frame, said left and right non-conductive pins securably attaching the elongate fixture frame to the left and right sockets within the fluorescent light compartment;

a heat conductive mounting surface on the elongate fixture frame;

a plurality of light-emitting diodes (LEDs) disposed along a length of said heat conductive mounting surface, for illuminating an interior area of the transit vehicle; and a power connector disposed rearward of the heat conductive mounting surface, for receiving a direct current voltage signal.

34. The LED-based lighting unit of claim 33, further comprising a diffusive lens cover removably attachable to an output opening of the fluorescent light compartment.

* * * * *